US009832570B2

(12) United States Patent
Kanemori et al.

(10) Patent No.: US 9,832,570 B2
(45) Date of Patent: Nov. 28, 2017

(54) SPECIAL SOUND PRODUCING DEVICE

(71) Applicant: Yazaki Corporation, Minato-ku, Tokyo (JP)

(72) Inventors: Daisuke Kanemori, Makinohara (JP); Hatsushi Akamine, Makinohara (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/317,435

(22) PCT Filed: Jun. 10, 2015

(86) PCT No.: PCT/JP2015/066761
§ 371 (c)(1),
(2) Date: Dec. 9, 2016

(87) PCT Pub. No.: WO2015/190530
PCT Pub. Date: Dec. 17, 2015

(65) Prior Publication Data
US 2017/0134858 A1    May 11, 2017

(30) Foreign Application Priority Data

Jun. 10, 2014  (JP) .................................. 2014-119499
Dec. 22, 2014  (JP) .................................. 2014-258269

(51) Int. Cl.
*H03G 5/00* (2006.01)
*H04R 3/14* (2006.01)
(Continued)

(52) U.S. Cl.
CPC ................. *H04R 3/14* (2013.01); *G08B 3/10* (2013.01); *H04R 1/24* (2013.01); *H04R 2499/13* (2013.01)

(58) Field of Classification Search
USPC ........ 381/59, 71.4, 85, 86, 98, 99, 300, 302, 381/332
See application file for complete search history.

(56) References Cited

U.S. PATENT DOCUMENTS 5,450,057 A    9/1995   Watanabe

FOREIGN PATENT DOCUMENTS

JP    H04-259877       9/1992
JP    H04259877    *  9/1992   ............. B60R 11/02
(Continued)

OTHER PUBLICATIONS

Dec. 15, 2016—International Preliminary Report on Patentability—App PCT/JP2015/066761, Eng Tran.
(Continued)

*Primary Examiner* — Yosef K Laekemariam
(74) *Attorney, Agent, or Firm* — Banner & Witcoff, Ltd.

(57) ABSTRACT

A special sound producing device which is loaded in a vehicle, and provides information to a vehicle crew by a special sound, includes a plurality of speakers which become the power sources of the special sound, and a control unit which generates frequency signals to make the special sound output from the plurality of speakers respectively, wherein when one information to be transmitted to the vehicle crew is transmitted by the special sound from the plurality of speakers, the control unit makes the frequencies of the frequency signals, the sound pressures of the special sound or the output timings to the speakers of the frequency signals to be different among the plurality of speakers.

12 Claims, 6 Drawing Sheets

(51) Int. Cl.
*H04R 1/24* (2006.01)
*G08B 3/10* (2006.01)

(56) References Cited

FOREIGN PATENT DOCUMENTS

| | | | |
|---|---|---|---|
| JP | H05-126948 A | 5/1993 | |
| JP | 2007-072631 A | 3/2007 | |
| JP | 2010-080995 A | 4/2010 | |
| JP | 2012-146316 | 8/2012 | |
| JP | 2013-065260 A | 4/2013 | |
| JP | 2013065260 * | 4/2013 | ............. B60R 21/00 |

OTHER PUBLICATIONS

Aug. 11, 2015—International Search Report—Intl App PCT/JP2015/066761.

\* cited by examiner

SPECIAL SOUND PRODUCING DEVICE

TECHNICAL FIELD

The present invention relates to a special sound producing device which is loaded in a vehicle and provides information to a vehicle crew by a special sound.

BACKGROUND ART

Traditionally, a special sound producing device which provides information to a vehicle crew by a special sound is proposed. The above device may be a device which outputs a warning sound by a buzzer or a device which outputs a warning sound by a speaker (refer to PTL 1, 2).

CITATION LIST

Patent Literature

PTL 1 JP-A-2007-72631
PTL 2 JP-A-2010-80995

SUMMARY OF THE INVENTION

Technical Problem

However, for the traditional special sound producing device, the warning sound cannot be transmitted to the vehicle crew precisely. That is, tens of different kinds of warning sounds are used in the vehicle, and the vehicle crew becomes hard to grasp what these warning sounds mean, respectively. Therefore, in the vehicle, to make it easy for the vehicle crew to grasp the meanings of the warning sounds, it is expected to increase the variation of sounds.

This problem is not limited to a warning sound (for example, an approaching sound indicating the approach of another vehicle or the like, a door opening sound and a seat belt non-wearing sound), but is a problem common to all special sounds (including the warning sound) such as vehicle operation sounds including a turning sound, sounds to provide refreshment or comfort to the vehicle crew in the vehicle, sounds that instruct and support the action of the vehicle crew and the like.

The present invention is made to solve such a problem, and the purpose of the present invention is to provide a special sound producing device to increase the variation of the sound that is provided in a vehicle, and to make it easy for a vehicle crew to grasp the meaning of the sound.

Solution to Problem

A special sound producing device of the present invention is loaded in a vehicle, and provides information to a vehicle crew by a special sound. The special sound producing device includes a plurality of speakers that become the power sources of the special sound, and a control unit that generates frequency signals to make the special sound output from the plurality of speakers respectively, wherein when one information to be transmitted to the vehicle crew is transmitted by the special sound from the plurality of speakers, the control unit makes the frequencies of the frequency signals, the sound pressures of the special sound or the output timings to the speakers of the frequency signals to be different between the plurality of speakers.

According to this special sound producing device of the present invention, one information to be transmitted to the vehicle crew is transmitted by the special sound from the plurality of speakers, the frequencies of the frequency signals to make the special sound output from the plurality of speakers respectively, the sound pressures of the special sound or the output timings to the speakers of the frequency signals are made different between the plurality of speakers. Therefore, the output special sound is recognized by the vehicle crew while there is at least one of mobility by the Haas effect, a sense of harmony, a sense of reverberation and a sense of emphasis. Thereby, the variation of sound to be provided in the vehicle is increased, and the vehicle crew can easily grasp the meaning of the sound.

In the special sound producing device of the present invention, the plurality of speakers are two speakers, and when the sound pressures of the special sound are made different, the control unit equalizes the output timings of the frequency signals and the frequencies of the frequency signals to the two speakers, gradually decreases a sound pressure control ratio which indicates either of a duty ratio of the frequency signal or an on duty, which is the duty ratio during an on state, of the frequency signal to one speaker from a first predetermined value to a second predetermined value which is smaller than the first predetermined value, and gradually increases the sound pressure control ratio of the frequency signal to the other speaker from the second predetermined value to the first predetermined value.

According to this special sound producing device, the output timings of the frequency signals and the frequencies of the frequency signals to the two speakers are equalized, the sound pressure control ratio which indicates either of a duty ratio of the frequency signal or an on duty, which is the duty ratio during an on state, of the frequency signal to one speaker is gradually decreased from a first predetermined value to a second predetermined value, and the sound pressure control ratio of the frequency signal to the other speaker is gradually increased from the second predetermined value to the first predetermined value. Thereby, in the early output period of the special sound, the sound at the side of the one speaker is perceived by the vehicle crew, and then the vehicle crew can feel that the perception point of the sound moves to the side of the other speaker. Thus, the sound can have mobility, and the variation of the sound to be provided in the vehicle can be increased.

In the special sound producing device of the present invention, the plurality of speakers are two speakers, and when the output timings are made different, the control unit equalizes the sound pressures of the special sound and the frequencies of the frequency signals, makes the output timing of the frequency signal to one speaker and the output timing of the frequency signal to the other speaker overlapped, and makes the output timing of the frequency signal to the other speaker delayed for more than a predetermined time than the output timing of the frequency signal to the one speaker.

According to this special sound producing device, the sound pressures of the special sound and the frequencies of the frequency signals to the two speakers are equalized, the output timing of the frequency signal to the one speaker and the output timing of the frequency signal to the other speaker are made overlapped, and the output timing of the frequency signal to the other speaker is delayed for more than a predetermined time than the output timing of the frequency signal to the one speaker. Thereby, in the early output period of the special sound, the sound at the side of the one speaker is perceived by the vehicle crew, and then the vehicle crew can feel that the perception point of the sound moves to the side of the other speaker. Thus, the sound can have mobility, and the variation of the sound to be provided in the vehicle can be increased.

In the special sound producing device of the present invention, the plurality of speakers are two speakers, and when the frequencies of the frequency signals are made different, if the frequency of the frequency signal to one speaker is f1, the control unit sets the frequency f2 of the frequency signal to the other speaker as a value calculated by an equation f1:f2=n:n+1, in which n is an integer of 1 or more.

According to this special sound producing device, when the frequency of the frequency signal to the one speaker is f1, the frequency f2 of the frequency signal to the second speaker is set as a value calculated by an equation f1:f2=n:n+1 (n is an integer of 1 or more). Thereby, the sound output from the one speaker and the sound output from the other speaker have a relation of chord, and will not become dissonant. Thus, the sound can have harmony, and the variation of the sound to be provided in the vehicle can be increased.

In the special sound producing device of the present invention, the plurality of speakers are two speakers, and when the frequencies of the frequency signals are made different, if the frequency of the frequency signal to one speaker is f1, the control unit sets the frequency f2 of the frequency signal to the other speaker as a value except values calculated by an equation f1:f2=n:n+1, in which n is an integer of 1 or more.

According to this special sound producing device, when the frequency of the frequency signal to the one speaker is f1, the frequency f2 of the frequency signal to the other speaker is set as a value except values calculated by an equation f1:f2=n:n+1 (n is an integer of 1 or more). Thereby, the sound output from the one speaker and the sound output from the other speaker have a relationship of dissonance, uncomfortable sounds can be output from the two speakers, and the variation of the sound to be provided in the vehicle can be increased.

In the special sound producing device of the present invention, the plurality of speakers are two speakers, and when the output timings are made different, the control unit equalizes the frequencies of the frequency signals to the two speakers, makes the output timing of the frequency signal to one speaker and the output timing of the frequency signal to the other speaker overlapped, and makes the output timing of the frequency signal to the other speaker delayed for less than a predetermined time from the output timing of the frequency signal to the one speaker.

According to this special sound producing device, the frequencies of the frequency signals to the two speakers are equalized, the output timing of the frequency signal to the one speaker and the output timing of the frequency signal to the other speaker are made overlapped, and the output timing of the frequency signal to the other speaker is delayed for less than a predetermined time than the output timing of the frequency signal to the one speaker. Thereby, while the vehicle crew perceives the sound from the one speaker, it is possible to feel a reverberation due to the sound from the other speaker. Thus, the variation of the sound to be provided in the vehicle can be increased by the sense of reverberation.

In the special sound producing device of the present invention, the sound pressure control ratio, which indicates either of a duty ratio or an on duty which is the duty ratio during on state, of the frequency signal to the other speaker may be made smaller than the sound pressure control ratio of the frequency signal to the one speaker.

According to this special sound producing device, because the sound pressure control ratio of the frequency signal to the other speaker is made smaller than the sound pressure control ratio of the frequency signal to the one speaker, the sound pressure of the sound from the other speaker becomes small, and it is possible to even have a sense of reverberation.

In the special sound producing device of the present invention, the plurality of speakers are two speakers, and when the output timings are made different, the control unit repeats an action of outputting the frequency signal to the other speaker after having output the frequency signal to one speaker, prohibits the output of the frequency signal to the other speaker in the output timing of the frequency signal to the one speaker and prohibits the output of the frequency signal to the one speaker in the output timing of the frequency signal to the other speaker.

According to this special sound producing device, an action of outputting the frequency signal to the other speaker after having output the frequency signal to one speaker is repeated, the output of the frequency signal to the other speaker in the output timing of the frequency signal to the one speaker is prohibited, and the output of the frequency signal to the one speaker in the output timing of the frequency signal to the other speaker is prohibited. Thereby, the vehicle crew perceives the sound alternately from the two speakers, and recognizes the special sound that is emphasized in comparison with that the sound is output from the two speakers SP1, SP2 in the same timings. Thus, the variation of the sound to be provided in the vehicle can be increased by the sense of emphasis.

In the special sound producing device of the present invention, the plurality of speakers are placed at a meter unit in which vehicle instruments are loaded, and information to promote attention by a warning sound is provided to the vehicle crew.

According to this special sound producing device, because the two speakers are placed in the meter unit where vehicle instruments are loaded, and information to promote attention is provided to the vehicle crew by the warning sound, the warning sound whose meaning is easy to be grasped can be output from the front of the vehicle driver who most wants the warning sound to be transmitted quickly and precisely.

In the special sound producing device of the present invention, a first terminal group including a plurality of terminals which can output the different frequency signals, respectively, a first summing circuit which sums the frequency signals from the first terminal group, a second terminal group including a plurality of terminals which can output different frequency signals, respectively, and a second summing circuit which sums the frequency signals from the second terminal group are included, and the output from the first summing circuit is input to one speaker, and the output from the second summing circuit is input to the other speaker.

According to this special sound producing device, the frequency signals can be superposed by the summing circuits, and the variation of the sound can be further increased.

Effects of the Invention

According to the special sound producing device of the present invention, the variation of the sound to be provided in a vehicle is increased, and the vehicle crew can easily grasp the meaning of the sound.

BRIEF DESCRIPTION OF DRAWINGS

FIGS. 5A and 5B include waveform charts which indicate the action of the special sound producing device of the third embodiment, in which FIG. 5A indicates the waveform of the first speaker, and FIG. 5B indicates the waveform of the second speaker.

FIGS. 6A and 6B include waveform charts which indicate the action of the special sound producing device of the fourth embodiment, in which FIG. 6A indicates the waveform of the first speaker, and FIG. 6B indicates the waveform of the second speaker.

DESCRIPTION OF EMBODIMENTS

The present invention is described based on preferred embodiments as follows, but the present invention is not limited to the embodiments shown below and may be modified appropriately without departing from the spirit of the present invention.

Figure 1:
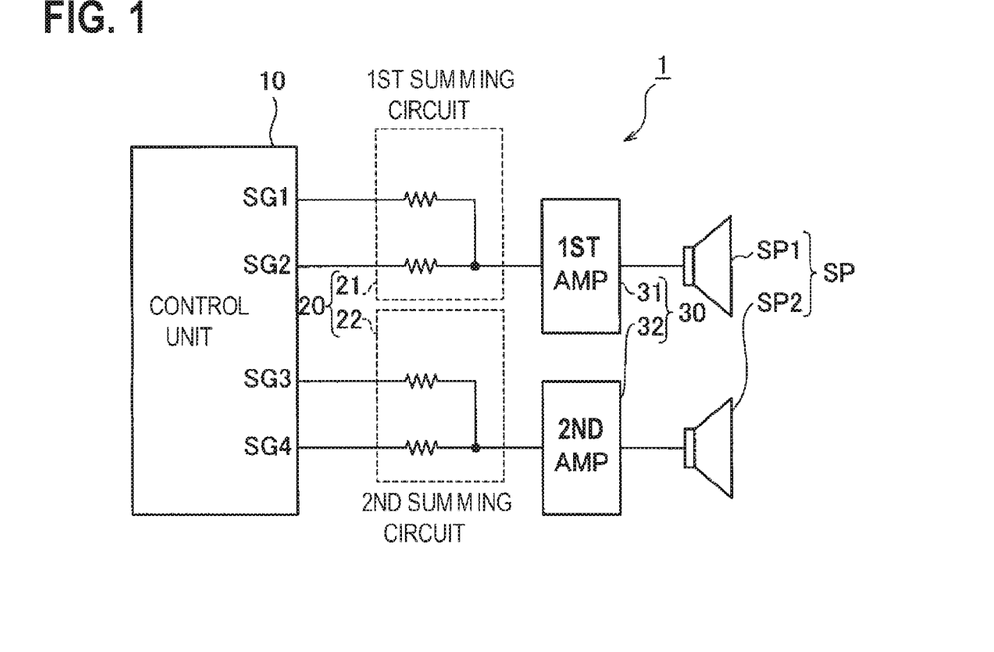
FIG. 1 is a circuit diagram which indicates the outline of a special sound producing device of a first embodiment of the present invention.

FIG. 1 is a circuit diagram which indicates the outline of a special sound producing device of the first embodiment of the present invention. The special sound producing device 1 shown in FIG. 1 is loaded in a vehicle, and provides information such as the approach of another vehicle or the like, door opening and seat belt non-wearing, by a warning sound (one kind of special sound) including an approaching sound which indicates the approach of another vehicle or the like, a door opening sound and a seat belt non-wearing sound, to call attention to a vehicle crew.

The special sound producing device 1 may output not only the warning sound but also other special sounds including a vehicle operation sound such as a turning sound to the vehicle crew, a sound to provide refreshment and comfort to the vehicle crew in the vehicle and a sound that instructs or supports the action of the vehicle crew. In the following description, it is described that the special sound producing device 1 outputs the warning sound.

The special sound producing device 1 of the first embodiment includes a plurality of speakers SP, a control unit (control means) 10, a plurality of summing circuits 20 and a plurality of amplifiers 30. The plurality of (two) speakers SP1, SP2 become power sources of the warning sound.

Figure 2:
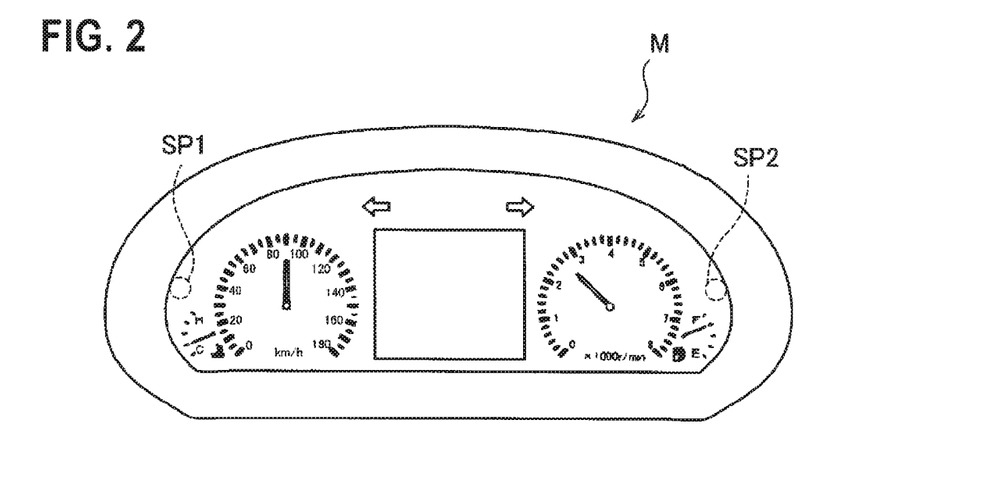
FIG. 2 is a front view of a meter unit.

FIG. 2 is a front view of a meter unit. The meter unit M shown in FIG. 2 is provided before a driver's seat, and the meter unit M is loaded with, for example, vehicle instruments such as a speedometer, a tachometer, a fuel meter and a water thermometer, and is provided with blinkers, a liquid crystal indicator and the like. Further, the meter unit M is provided with a first speaker SP1 and a second speaker SP2 at the back side. These speakers SP1, SP2 are spaced in the rightward/leftward direction (relative to the direction in which the vehicle runs) by being provided respectively at the end sides of the meter unit M which is horizontally long.

According to FIG. 1, the control unit 10 generates frequency signals to output the warning sound from the first and the second speakers SP1, SP2, respectively, and, for example, is constructed of a microcomputer. The control unit 10 has a first to a fourth sound generator terminals SG1-SG4 (hereinafter referred to as, the first to the fourth terminals SG1-SG4), and outputs the above signals from these terminals SG1-SG4.

The plurality of (two) summing circuits 20 sum signals from the first to the fourth terminals SG1-SG4, in which the first summing circuit 21 sums signals from the first and the second terminals SG1, SG2, and the second summing circuit 22 sums signals from the third and the fourth terminals SG3, SG4. These summing circuits 21, 22 are constructed, for example, of analog summing circuits of general resistances. The first and the second terminals SG1, SG2 form a first terminal group, and the third and the fourth terminals SG3, SG4 form a second terminal group.

The plurality of (two) amplifiers 30 amplify the signals from the plurality of summing circuits 20, and output to the plurality of speakers SP, in which a first amplifier 31 amplifies the signal from the first summing circuit 21 and outputs to the first speaker SP1, and a second amplifier 32 amplifies the signal from the second summing circuit 22 and outputs to the second speaker SP2.

In the special sound producing device 1 of the first embodiment, the control unit 10 transmits one information (for example, one of the approach of another vehicle, door opening and seat belt non-wearing) to be transmitted to the vehicle crew by the warning sound from the plurality of speakers SP. The control unit 10 makes the sound pressures of the warning sound different between the plurality of speakers SP. Here, the sound pressure of the warning sound is changed by changing sound pressure control ratio which indicates either of the duty ratio of the frequency signal or the on duty, which is the duty ratio during the on state, of the frequency signal. Thus, the control unit 10 makes the sound pressure control ratios (in other words, the duty ratios or the on duties) different between the plurality of speakers SP. An example is described in the following first embodiment in which the on duty which is one kind of the sound pressure control ratio is made different.

In this embodiment, the number of the plurality of speakers SP is two. The control unit 10 makes output timings of the frequency signals to the two speakers SP1, SP2 (in other words, the sound output periods when sounds are output from the two speakers SP1, SP2) and the frequency f of the frequency signals the same, and continually decreases the on duty of the frequency signal to the first speaker (one speaker) SP1 from the first predetermined value (for example, 100%) to the second predetermined value (for example, 50%) that is smaller than the first predetermined value, and continually increases the on duty of the frequency signal to the second speaker (the other speaker) SP2 from the second predetermined value to the first predetermined value. Thereby, the sound can have mobility due to Haas effect, and the variation of the sound to be provided in the vehicle can be increased.

Figure 3A:
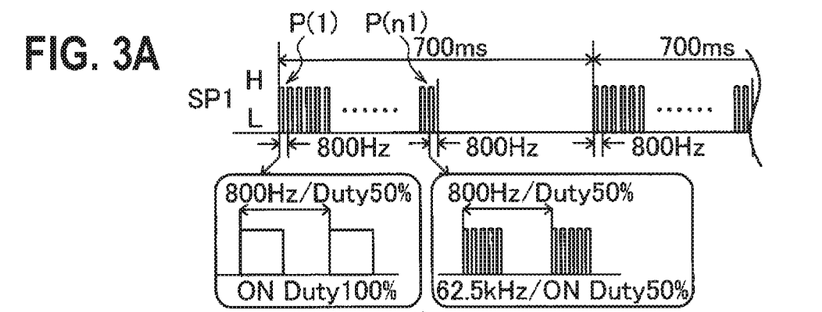
FIGS. 3A and 3B include waveform charts which indicate the action of the special sound producing device of the first embodiment, in which FIG. 3A indicates the waveform of a first speaker, and FIG. 3B indicates the waveform of a second speaker.
Figure 3B:
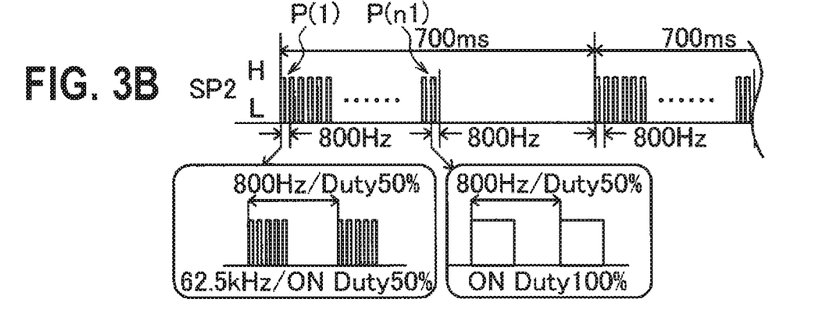

FIGS. 3A and 3B include waveform charts which indicate the action of the special sound producing device 1 of the first embodiment, in which FIG. 3A indicates the waveform of the first speaker SP1, and FIG. 3B indicates the waveform of the second speaker SP2. Below, an example is described in which the control unit 10 outputs the signal from one of the first terminal SG1 and the second terminal SG2 and outputs the signal from one of the third terminal SG3 and the fourth terminal SG4.

As shown in FIGS. 3A and 3B, the signals output to the first speaker SP1 and the second speaker SP2 have a period of 700 ms. Among the signals of the 700 ms period, the former half portion becomes a frequency signal of 800 Hz (frequency f) to repeat an H level and an L level alternately, and the latter half portion becomes a signal of the L level. The duty ratio of the frequency signal of 800 Hz becomes 50%.

As shown in FIG. 3A, among the frequency signals of 800 Hz output to the first speaker SP1, the on duty, which is the duty ratio during the on state, of the first frequency signal $P_{(1)}$ becomes 100%, as shown in an extended waveform. In contrast, among the frequency signals of 800 Hz, the on duty of the last frequency signal $P_{(n1)}$ (n1 is an integer of 2 or more) becomes 50%, as shown in an extended waveform. The on duties of the frequency signals of 800 Hz existing between them gradually decrease in a range from less than 100% to more than 50%. That is, when the on duty of the $i_{th}$ (i is an integer of 2 or more) frequency signal is assumed as $P_{(i)\ on}$, $P_{(i-x-1)\ on} > P_{(i-x)\ on} > P_{(i-x+1)\ on}$. X is an arbitrary positive integer to meet (i-x)>=2.

Thus, the control unit 10 gradually decreases the on duties of the frequency signals of 800 Hz output to the first speaker SP1 from the first predetermined value (for example, 100%) to the second predetermined value (for example, 50%). The frequency while the pulses P are on when the on duties are less than 100% is assumed as 62.5 kHz, and is a frequency in a range that can be perceived with the ear of a person.

As shown in FIG. 3B, for the frequency signals of 800 Hz (frequency f) output to the second speaker SP2, as shown in an extended waveform, the on duty of the first frequency signal $P_{(1)}$ becomes 50%, and the on duty of the last frequency signal $P_{(n1)}$ becomes 100%. The on duties of the frequency signals of 800 Hz existing between them gradually increase in a range from more than 50% to less than 100%. That is, the on duty $P_{(i)\ on}$ of the $i_{th}$ frequency signal meets $P_{(i-x-1)\ on} < P_{(i-x)\ on} < P_{(i-x+1)\ on}$.

Thus, the control unit 10 gradually increases the on duties of the frequency signals of 800 Hz output to the second speaker SP2 from the second predetermined value (for example, 50%) to the first predetermined value (for example, 100%). Similarly, for the frequency signals, the frequency while the pulses P are on when the on duties are less than 100% is assumed as 62.5 kHz, and is a frequency in a range that can be perceived with the ear of a person.

Thereby, the vehicle crew perceives the sound as follows. That is, the vehicle crew perceives the sound at the side of the first speaker SP1 in an early output period of the warning sound. Furthermore, after the early output period of the warning sound, the vehicle crew will feel that the perception point of the sound moves to the side of the second speaker SP2. When the sound is perceived in this way, it is necessary to make the output timings of the frequency signals and the frequencies (800 Hz in the example shown in FIGS. 3A and 3B) of the frequency signals to the two speakers SP1, SP2 equal (equal means a concept including a small difference of a degree not recognized with the ear of a person).

It is described as an example that the frequency signals are output from one of the first terminal SG1 and the second terminal SG2 and the frequency signals are output from one of the third terminal SG3 and the fourth terminal SG4, but the present invention is not limited to this. It is also possible that the same frequency signals are output from the two sides and the superposition of the waveform may be performed by the summing circuit 20, and it is also possible that different frequency signals, if possible, are output from the two sides and the superposition of the waveform may be performed by the summing circuit 20. Particularly, when the different frequency signals are output from the two sides, the variation of the sound can be further increased by superposing waveforms.

Furthermore, in the above embodiment, while the on duties of the frequency signals to the first speaker SP1 are continually decreased to the second predetermined value from the first predetermined value, the on duties of the frequency signals to the second speaker SP2 are continually increased for the first predetermined value from the second predetermined value. However, not only the on duty, but also the duty ratio may be processed as above. That is, the control unit 10 may continually decrease the duty ratio of the frequency signals to the first speaker SP1 from the first predetermined value to the second predetermined value, and may continually increase the duty ratio of the frequency signals to the second speaker SP2 from the second predetermined value to the first predetermined value. Thereby, a similar effect is obtained.

In this way, according to the special sound producing device 1 of the first embodiment, one information to be transmitted to the vehicle crew is transmitted by the warning sound from the plurality of speakers SP, and the sound pressures of the warning sound are made different between the plurality of speakers SP. Thereby, the variation of sound to be provided in the vehicle is increased, and the vehicle crew can easily grasp the meaning of the sound.

The output timings of the frequency signals to the two speakers SP1, SP2 and the frequencies of the frequency signals are the same and while the sound pressure control ratio of the frequency signals to the first speaker SP1 is decreased from the first predetermined value to the second predetermined value, the sound pressure control ratio of the frequency signals to the second speaker SP2 is increased from the second predetermined value to the first predetermined value. Thereby, in the early output period of the warning sound, the sound at the side of the first speaker SP1 is perceived by the vehicle crew, and then the vehicle crew can feel that the perception point of the sound moves to the side of the second speaker SP2. Thus, the sound can have mobility, and the variation of the sound to be provided in the vehicle can be increased.

Because the traditional device only produces the warning sound simply, it is impossible to inform the vehicle crew of, for example, the approaching direction of another vehicle or the like, and there is an improvement room in transmitting the meaning of the sound to the vehicle crew precisely. However, in the first embodiment, the information on the direction can be transmitted by a sound that has mobility, and the meaning of the sound can be transmitted to the vehicle crew precisely.

Because the two speakers SP1, SP2 are placed in the meter unit M where vehicle instruments are loaded, and information to promote attention is provided to the vehicle crew by the warning sound, the warning sound whose meaning is easy to be grasped can be output from the front of the vehicle driver who most wants the warning sound to be transmitted quickly and precisely. In addition, as shown in FIG. 2, when the speakers SP1, SP2 are placed at the right and left sides of the driver when the vehicle is driven, by using the mobility of the sound due to Haas effect, for example, the warnings such as the approach of an obstacle from the right, the opening of the right door, the seat belt non-wearing of the right seat and the deflation of the right tire can be output.

Furthermore, the first terminal group including the plurality of terminals SG1, SG2 which can output different frequency signals, respectively, the first summing circuit 21 which sums the frequency signals from the first terminal group SG1, SG2, the second terminal group including the plurality of terminals SG3, SG4 which can output different frequency signals, respectively, and the second summing circuit 22 which sums the frequency signals from the second terminal group SG3, SG4 are included, and the output from the first summing circuit 21 is input to the first speaker SP1, and the output from the second summing circuit 22 is input to the second speaker SP2. Therefore, the frequency signals can be superposed by the summing circuits 21, 22, and the variation of the sound can be further increased.

Then, the second embodiment of the present invention is described. The special sound producing device 1 of the second embodiment is similar to that of the first embodiment, but a part of the action is different from that of the first embodiment. The difference from the first embodiment is described as follows.

The control unit 10 in the second embodiment makes the output timings of the frequency signals different between the plurality of speakers SP, to output the warning sound from the plurality of speakers SP respectively.

In detail, while the control unit 10 makes the sound pressures of the warning sound from the two speakers SP1, SP2 and the frequencies f of the frequency signals to the two speakers SP1, SP2 equal, the control unit 10 makes the output timing of the signal to the first speaker (one speaker) SP1 and the output timing of the frequency signal to the second speaker (the other speaker) SP2 overlapped, and makes the output timing of the signal to the second speaker SP2 delayed for a predetermined time (for example, 100 ms) from the output timing of the frequency signal to the first speaker SP1. Thereby, like the first embodiment, the sound can have mobility due to Haas effect, and the variation of the sound to be provided in the vehicle can be increased. The sound pressures of the warning sound can be the same by equalizing the duty ratio and the on duty.

Figure 4A:
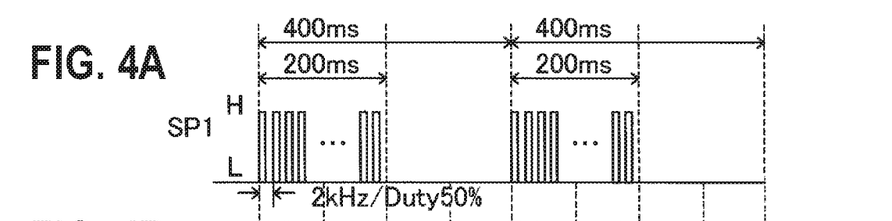
FIGS. 4A and 4B include waveform charts which indicate the action of the special sound producing device of the second embodiment, in which FIG. 4A indicates the waveform of the first speaker, and FIG. 4B indicates the waveform of the second speaker.
Figure 4B:
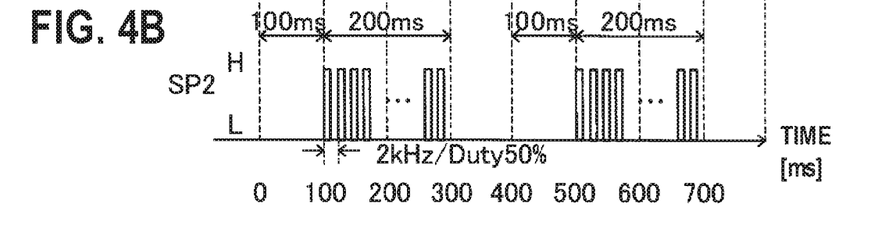

FIGS. 4A and 4B include waveform charts which indicate the action of the special sound producing device 1 of the second embodiment, in which FIG. 4A indicates the waveform of the first speaker SP1, and FIG. 4B indicates the waveform of the second speaker SP2. As shown in FIGS. 4A and 4B, the signals output to the first speaker SP1 and the second speaker SP2 have a period of 400 ms. Among the signals of the 400 ms period, the former half portion becomes a frequency signal of 2 kHz (frequency f) to repeat an H level and an L level alternately, and the latter half portion becomes a signal of the L level. The duty ratio of the frequency signal of 2 kHz becomes 50%.

As shown in FIGS. 4A and 4B, the output start point of the frequency signal of 2 kHz output to the second speaker SP2 is delayed only 100 ms from the output start point of the frequency signal of 2 kHz output to the first speaker SP1, and the output timing is from 100 ms to 300 ms. Because the first speaker SP1 emits the sound in a period when the frequency signal is input, the sound output period of the first speaker SP1 is from 0 to 200 ms, and the sound output period of the second speaker SP2 is from 100 ms to 300 ms. Thus, while the sound output periods (output timings) are overlapped, the sound output period (output timing) of the second speaker SP2 is delayed more than a predetermined time from the sound output period (output timing) of the first speaker SP1. The output periods when the sounds are output from the two speakers SP become the same, for example, 200 ms.

Thereby, the vehicle crew perceives the sound as follows. That is, like the first embodiment, the vehicle crew perceives the sound at the side of the first speaker SP1 in an early output period of the warning sound. Furthermore, after the early output period of the warning sound, the vehicle crew will feel that the perception point of the sound moves to the side of the second speaker SP2. When the sound is perceived in this way, it is necessary to make the sound pressures of the warning sound from the two speakers SP1, SP2 and the frequency f (2 kHz in the example shown in FIGS. 4A and 4B) of the frequency signals from the two speakers SP1, SP2 equal (equal means a concept including a small difference of a degree not recognized with the ear of a person).

In this way, according to the special sound producing device 1 of the second embodiment, like the first embodiment, the variation of the sound to be provided in the vehicle is increased, the vehicle crew can easily grasp the meaning of the sound, and the warning sound whose meaning is easy to be grasped can be output from the front of the vehicle driver who most wants the warning sound to be transmitted quickly and precisely. By using the mobility of the sound due to Haas effect, for example, the warnings such as the approach of an obstacle from the right, the opening of the right door, the seat belt non-wearing of the right seat and the deflation of the right tire can be output. The signals can be superposed by the summing circuits 21, 22, and the variation of the sound can be further increased.

Furthermore, according to the second embodiment, the sound pressures of the warning sound and the frequencies of the frequency signals to the two speakers SP1, SP2 are the same, and while the output timing of the frequency signal to the first speaker SP1 and the output timing of the frequency signal to the second speaker SP2 are overlapped, the output timing of the frequency signal to the second speaker SP2 is delayed more than a predetermined time from the output timing of the frequency signal to the first speaker SP1. Thereby, in the early output period of the warning sound, the sound at the side of the first speaker SP1 is perceived by the vehicle crew, and then the vehicle crew can feel that the perception point of the sound moves to the side of the second speaker SP2. Thus, the sound can have mobility, and the variation of the sound to be provided in the vehicle can be increased.

Because the traditional device only produces the warning sound simply, it is impossible to inform the vehicle crew of, for example, the approaching direction of another vehicle or the like, and there is an improvement room in transmitting the meaning of the sound to the vehicle crew precisely. However, in the first embodiment, the information on the direction can be transmitted by a sound that has mobility, and the meaning of the sound can be transmitted to the vehicle crew precisely.

Then, the third embodiment of the present invention is described. The special sound producing device 1 of the third embodiment is similar to that of the first embodiment, but a part of the action is different from that of the first embodiment. The difference from the first embodiment is described as follows.

The control unit 10 in the third embodiment makes the frequencies of the frequency signals different between the plurality of speakers SP, to output the warning sound from the plurality of speakers SP respectively.

More particularly, when the frequency of the frequency signal to the first speaker SP1 is f1, the control unit 10 sets the frequency f2 of the frequency signal to the second speaker SP2 as a value calculated by an equation f1:f2=n2:n2+1 (n2 is an integer of 1 or more). Thereby, a sense of harmony can be felt for the sound, and the variation of the sound to be provided in the vehicle can be increased.

FIGS. 5A and 5B include waveform charts which indicate the action of the special sound producing device 1 of the third embodiment, in which FIG. 5A indicates the waveform of the first speaker SP1, and FIG. 5B indicates the waveform of the second speaker SP2. As shown in FIGS. 5A and 5B, the signals output to the first speaker SP1 and the second speaker SP2 have a period of 400 ms. Among the signals of the 400 ms period, the former half portion becomes a frequency signal to repeat an H level and an L level alternately, and the latter half portion becomes a signal of the L level. The duty ratio of the frequency signal becomes 50%.

As shown in FIG. 5A, the frequency f1 of the frequency signal output to the first speaker SP1 becomes 800 Hz. On the other hand, as shown in FIG. 5B, the frequency f2 of the frequency signal output to the second speaker SP2 becomes 1.0 kHz. Thus, the frequencies f1, f2 of the two sides correspond to a relation of n2=4 in the equation of f1:f2=n2:n2+1 In this case, the sounds from the first and the second speakers SP1, SP2 become the relationship of chord, and the alarming sound can have a harmony sense.

When the frequency f1 of the frequency signal output to the first speaker SP1 is 800 Hz, the frequency f2 of the frequency signal output to the second speaker SP2 may be 1,600 Hz (n2=1), may be 1,067 Hz (n2=3), and should correspond to the equation of f1:f2=n2:n2+1.

When the sound having a sense of harmony is perceived by the vehicle crew, the sound pressure control ratios of the signals to the two speakers SP1, SP2 may be different. If the output timings (sound output periods) of the signals to the two speakers SP1, SP2 include overlapped periods, the overlapped periods may be different so that it is possible to have a sense of harmony.

In this way, according to the special sound producing device 1 of the third embodiment, like the first embodiment, the variation of the sound to be provided in the vehicle is increased, the vehicle crew can easily grasp the meaning of the sound, and the warning sound whose meaning is easy to be grasped can be output from the front of the vehicle driver who most wants the warning sound to be transmitted quickly and precisely. The signals can be superposed by the summing circuits 21, 22, and the variation of the sound can be further increased.

According to the third embodiment, when the frequency of the frequency signal to the first speaker SP1 is f1, the frequency f2 of the frequency signal to the second speaker SP2 is a value calculated by an equation f1:f2=n2:n2+1 (n2 is an integer of 1 or more). Thereby, the sound output from the first speaker SP1 and the sound output from the second speaker SP2 have a relation of chord, and will not become dissonant. Thus, the sound can have harmony, and the variation of the sound to be provided in the vehicle can be increased.

The traditional device only produces the warning sound simply. Therefore, there is a problem that information is transmitted after the sound has a sense of quality or a sense of warning degree (that is, the sense of the urgent degree of the warning). However, in the third embodiment, it is possible, for example, to transmit information by the sound from the first speaker SP1 and to give a sense of harmony and to produce a sense of quality by the sound from the second speaker SP2, and it is possible to transmit information whose degree of warning is low.

Then, the fourth embodiment of the present invention is described. The special sound producing device 1 of the fourth embodiment is similar to that of the first embodiment, but a part of the action is different from that of the first embodiment. The difference from the first embodiment is described as follows.

The control unit 10 in the fourth embodiment makes the output timings (sound output periods) of the frequency signals different between the plurality of speakers SP, to output the warning sound from the plurality of speakers SP respectively.

At this time, while the control unit 10 makes the frequencies of the frequency signals to the two speakers SP1, SP2 equal, the control unit 10 makes the output timing of the frequency signal to the first speaker (one speaker) SP1 and the output timing of the frequency signal to the second speaker (the other speaker) SP2 overlapped, and makes the output timing of the frequency signal to the second speaker SP2 delayed for less than a predetermined time (for example, 100 ms) from the output timing of the frequency signal to the first speaker SP1. Thereby, a sense of reverberation can be felt for the sound, and the variation of the sound to be provided in the vehicle can be increased.

FIGS. 6A and 6B include waveform charts which indicate the action of the special sound producing device 1 of the fourth embodiment, in which FIG. 6A indicates the waveform of the first speaker SP1, and FIG. 6B indicates the waveform of the second speaker SP2. As shown in FIGS. 6A and 6B, the signals output to the first speaker SP1 and the second speaker SP2 have a period of 400 ms. Among the signals of the 400 ms period, the former half portion becomes a frequency signal of 2 kHz (frequency f) to repeat an H level and an L level alternately, and the latter half portion becomes a signal of the L level. The duty ratio of the frequency signal of 2 kHz becomes 50%.

As shown in FIGS. 6A and 6B, the output start point of the frequency signal of 2 kHz output to the second speaker SP2 is delayed only 50 ms from the output start point of the frequency signal of 2 kHz output to the first speaker SP1, and the output timing is from 50 ms to 250 ms. Because the first speaker SP1 emits a sound in the period when the frequency signal is input, the sound output period of the first speaker SP1 is from 0 to 200 ms, and the sound output period of the second speaker SP2 is from 50 ms to 250 ms. Thus, while the sound output periods (output timings) are overlapped, the sound output period (output timing) of the second speaker SP2 is delayed less than a predetermined time from the sound output period (output timing) of the first speaker SP1. The output periods when the sounds are output from the two speakers SP become the same, for example, 200 ms.

It is preferable that the on duty of the frequency signal to the second speaker SP2 is made smaller than the on duty of the frequency signal to the first speaker. For example, in the example shown in FIGS. 6A and 6B, while the on duty of the frequency signal output to the first speaker SP1 is 100%, the on duty of the frequency signal output to the second speaker SP2 is 50%.

Thus, when the on duty of the frequency signal output to the second speaker SP2 is smaller than the on duty of the frequency signal output to the first speaker SP1, the sound pressure of the warning sound from the second speaker SP2 can be lower than the sound pressure of the warning sound from the first speaker SP1, and it is possible to even have a sense of reverberation. In the frequency signal of 2 kHz to the second speaker SP2, the frequency during the on state is assumed as 62.5 kHz, and is a frequency in a range that can be perceived with the ear of a person.

Not only the on duty, but also the duty ratio may be processed as above. That is, the duty ratio of the frequency signal output to the second speaker SP2 may be lower than the duty ratio of the frequency signal output to the first speaker SP1. Thereby, it is possible to even have a sense of reverberation.

Accordingly, the vehicle crew perceives the sound as follows. That is, the vehicle crew perceives a sound from the side of the first speaker SP1. Furthermore, the vehicle crew will, after a time point when the sound from the side of the first speaker SP1 is not output, perceive a sound from the side of the second speaker SP2 as the reverberation. When the sound is perceived in this way, it is necessary to make the frequencies f (2 kHz in the example shown in FIGS. 6A and 6B) of the frequency signals to the two speakers SP1, SP2 equal (equal means a concept including a small difference of a degree not recognized with the ear of a person).

In this way, according to the special sound producing device 1 of the fourth embodiment, like the first embodiment, the variation of the sound to be provided in the vehicle is increased, the vehicle crew can easily grasp the meaning of the sound, and the warning sound whose meaning is easy to be grasped can be output from the front of the vehicle driver who most wants the warning sound to be transmitted quickly and precisely. The frequency signals can be superposed by the summing circuits 21, 22, and the variation of the sound can be further increased.

Furthermore, according to the fourth embodiment, the frequencies of the frequency signals to the two speakers SP1, SP2 are the same, and while the output timing of the frequency signal to the first speaker SP1 and the output timing of the frequency signal to the second speaker SP2 are overlapped, the output timing of the frequency signal to the second speaker SP2 is delayed less than a predetermined time from the output timing of the frequency signal to the first speaker SP1. Thereby, while the vehicle crew perceives the sound from the first speaker SP1, it is possible to feel the reverberation due to the sound from the second speaker SP2. Thus, the variation of the sound to be provided in the vehicle can be increased by the sense of reverberation.

Because the sound pressure control ratio of the frequency signal to the second speaker SP2 is lowered than the sound pressure control ratio of the frequency signal to the first speaker SP1, the sound pressure of the sound from the second speaker SP2 becomes small, and it is possible to even have a sense of reverberation.

The traditional device only produces the warning sound simply. Therefore, there is a problem that information is transmitted after the sound has a sense of quality or a sense of warning degree (that is, the sense of the urgent degree of the warning). However, in the fourth embodiment, it is possible, for example, to transmit information by the sound from the first speaker SP1 and to give a sense of reverberation and to produce a sense of quality by the sound from the second speaker SP2, and it is possible to transmit information whose degree of warning is low.

Then, the fifth embodiment of the present invention is described. The special sound producing device 1 of the fifth embodiment is similar to that of the first embodiment, but a part of the action is different from that of the first embodiment. The difference from the first embodiment is described as follows.

The control unit 10 in the fifth embodiment makes the output timings (sound output periods) of the frequency signals different between the plurality of speakers SP, to output the warning sound from the plurality of speakers SP respectively.

In particular, the control unit 10 repeats an action of outputting the frequency signal to the second speaker (the other speaker) SP2 after having outputting the frequency signal to the first speaker (one speaker) SP1, prohibits the output of the frequency signal to the second speaker SP2 in the output timing of the frequency signal to the first speaker SP1, and prohibits the output of the frequency signal to the first speaker SP1 in the output timing of the frequency signal to the second speaker SP2. Thereby, the two speakers SP1, SP2 output the warning sound alternately so that the warning sound has a sense of emphasis, and the variation of the sound to be provided in the vehicle can be increased.

Figure 7A:
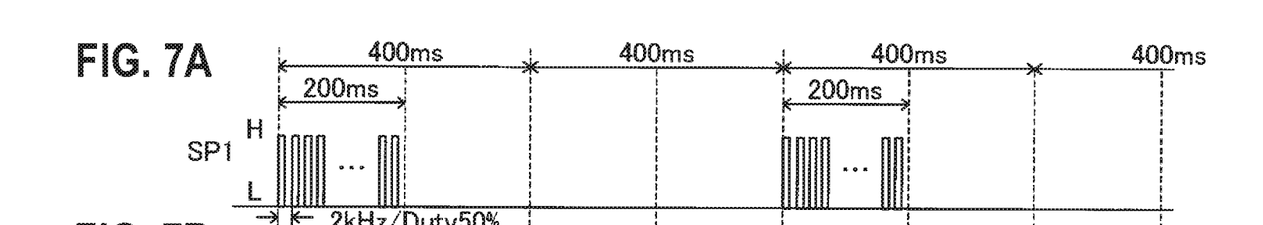
FIGS. 7A and 7B include waveform charts which indicate the action of the special sound producing device of the fifth embodiment, in which FIG. 7A indicates the waveform of the first speaker, and FIG. 7B indicates the waveform of the second speaker.
Figure 7B:
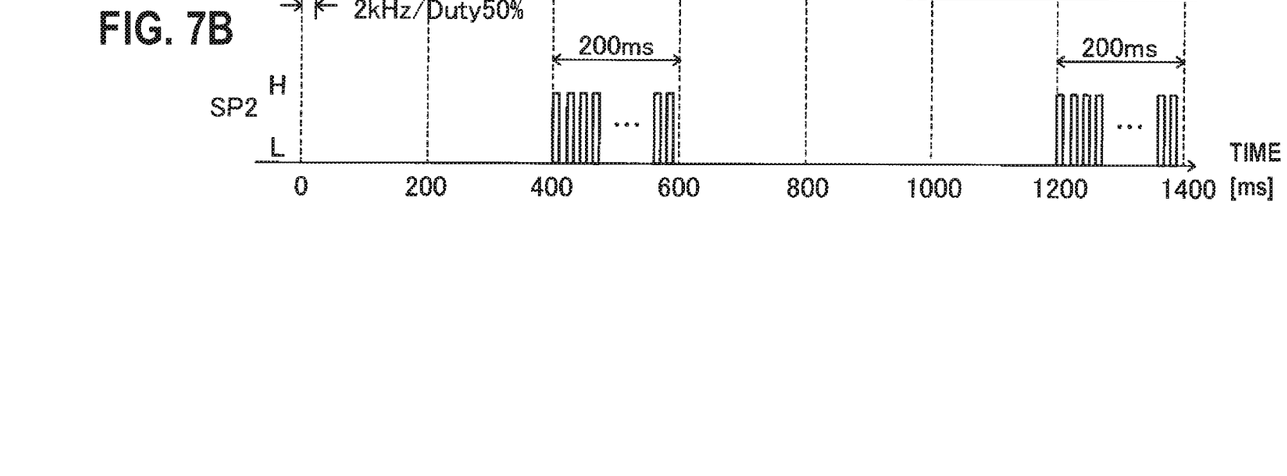

FIGS. 7A and 7B include waveform charts which indicate the action of the special sound producing device 1 of the fifth embodiment, in which FIG. 7A indicates the waveform of the first speaker SP1, and FIG. 7B indicates the waveform of the second speaker SP2. As shown in FIGS. 7A and 7B, the signals output to the first speaker SP1 and the second speaker SP2 have a period of 400 ms. Among the signals of the 400 ms period, the former half portion becomes a frequency signal of 2 kHz to repeat an H level and an L level alternately, and the latter half portion becomes a signal of the L level. The duty ratio of the frequency signal of 2 kHz becomes 50%.

Furthermore, while the output timings (sound output periods) of the frequency signal to the first speaker SP1 become 0 to 200 ms and 600 ms to 800 ms, the output timings (sound output periods) of the frequency signal to the second speaker SP2 become 400 ms to 600 ms and 1200 ms to 1400 ms. Thus, the control unit 10 repeats an action of outputting the frequency signal to the second speaker SP2 after having output the frequency signal to the first speaker SP1. The periods from 200 to 400 ms, 600 to 800 ms and 1000 to 1200 ms become silent periods when the warning sound is not output.

The signals output to the first speaker SP1 and the second speaker SP2 have a period of 400 ms. Therefore, the periods 400 to 600 ms and 1200 ms to 1400 ms are periods when the frequency signal should have been output to the first speaker SP1, but the control unit 10 in the present embodiment prohibits the output of the frequency signal and the first speaker SP1 becomes silent in the above periods. Similarly, the periods 0 to 200 ms and 800 ms to 1000 ms are periods when the frequency signal should have been output to the second speaker SP2, but the control unit 10 in the present embodiment prohibits the output of the signal and the second speaker SP2 becomes silent in the above periods. Thus, in the fifth embodiment, the output timings (sound output periods) of the frequency signals are different and not overlapped at the two speakers SP1, SP2.

Thereby, the vehicle crew perceives the warning sound alternately from the two speakers SP1, SP2. That is, the vehicle crew will recognize the warning sound that is emphasized in comparison with that the sound is output from the two speakers SP1, SP2 in the same timings. When the sound is perceived in this way, it is not necessary to equalize the frequencies (2 kHz in the example shown in FIGS. 7A and 7B) of the frequency signals to the two speakers SP1, SP2 and the sound pressures of the warning sound.

Figure 8A:
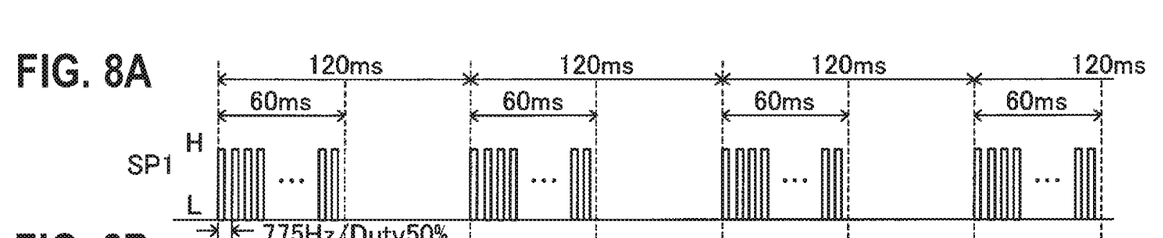
FIGS. 8A and 8B include waveform charts which indicate the action of a variation of the special sound producing device of the fifth embodiment, in which FIG. 8A indicates the waveform of the first speaker, and FIG. 8B indicates the waveform of the second speaker.
Figure 8B:
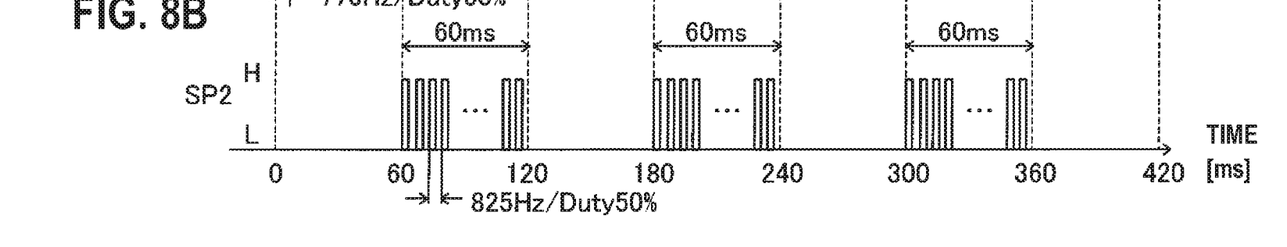

FIGS. 8A and 8B include waveform charts which indicate the action of a variation of the special sound producing device 1 of the fifth embodiment, in which FIG. 8A indicates the waveform of the first speaker SP1, and FIG. 8B indicates the waveform of the second speaker SP2. As shown in FIGS. 8A and 8B, the signals output to the first speaker SP1 and the second speaker SP2 have a period of 120 ms. Among the signals of the 120 ms period, the former half portion becomes a frequency signal to repeat an H level and an L level alternately, and the latter half portion becomes a signal of the L level. The duty ratio of the frequency signal becomes 50%.

As shown in FIG. 8A, the frequency f1 of the frequency signal output to the first speaker SP1 becomes 775 Hz. On the other hand, as shown in FIG. 5B, the frequency f2 of the frequency signal output to the second speaker SP2 becomes 825 Hz.

Furthermore, while the output timings (sound output periods) of the frequency signal to the first speaker SP1 become 0 to 60 ms, 120 ms to 180 ms, 240 ms to 300 ms and 360 ms to 420 ms, the output timings (sound output periods) of the frequency signal to the second speaker SP2 become 60 ms to 120 ms, 180 ms to 240 ms and 300 ms to 360 ms. That is, in the example shown in FIGS. 8A and 8B, silent periods when the warning sound is not output are not provided. Thus, the control unit 10 of the variation repeats an action of outputting the frequency signal to the second speaker SP2 after having output the frequency signal to the first speaker SP1 without providing the silent periods when the warning sound is not output from the two speakers SP.

Thereby, like the example shown in FIGS. 7A and 7B the vehicle crew perceives the warning sound alternately from the two speakers SP1, SP2. That is, the vehicle crew will recognize the warning sound that is emphasized in comparison with that the sound is output from the two speakers SP1, SP2 in the same timings.

In this way, according to the special sound producing device 1 of the fifth embodiment, like the first embodiment, the variation of the sound to be provided in the vehicle is increased, the vehicle crew can easily grasp the meaning of the sound, and the warning sound whose meaning is easy to be grasped can be output from the front of the vehicle driver who most wants the warning sound to be transmitted quickly and precisely. The frequency signals can be superposed by the summing circuits 21, 22, and the variation of the sound can be further increased.

According to the fifth embodiment, an action of outputting the frequency signal to the second speaker SP2 after having outputting the frequency signal to the first speaker SP1 is repeated, the output of the frequency signal to the second speaker SP2 in the output timing of the frequency signal to the first speaker SP1 is prohibited, and the output of the frequency signal to the first speaker SP1 in the output timing of the frequency signal to the second speaker SP2 is prohibited. Thereby, the vehicle crew perceives the sound alternately from the two speakers SP1, SP2, and recognizes the warning sound that is emphasized in comparison with that the sound is output from the two speakers SP1, SP2 in the same timings. Thus, the variation of the sound to be provided in the vehicle can be increased by the sense of emphasis.

The traditional device only produces the warning sound simply. Therefore, for the special sound (warning sound in particular), there is a room for improvement in that the meaning of the sound is surely recognized by the vehicle crew without any examination. However, in the fifth embodiment, since the special sound is output alternately from the two speakers SP1, SP2, the special sound is emphasized and transmitted to the vehicle crew, the attention of the vehicle crew is caught and the meaning of the sound can be easily and surely recognized.

Then, the sixth embodiment of the present invention is described. The special sound producing device 1 of the sixth embodiment is similar to that of the first embodiment, but a part of the action is different from that of the first embodiment. The difference from the first embodiment is described as follows.

The control unit 10 in the sixth embodiment makes the frequencies of the frequency signals different between the plurality of speakers SP, to output the warning sound from the plurality of speakers SP respectively.

More particularly, when the frequency of the frequency signal to the first speaker SP1 is f1, the control unit 10 sets the frequency f2 of the frequency signal to the second speaker SP2 as a value except the values calculated by an equation $f1:f2=n2:n2+1$ (n2 is an integer of 1 or more). Thereby, the sound output from the first speaker SP1 and the sound output from the second speaker SP2 have a relationship of dissonance, uncomfortable sounds can be output from the two speakers SP, and the variation of the sound to be provided in the vehicle can be increased.

Figure 9A:
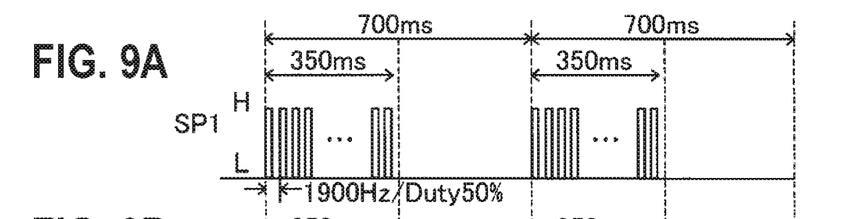
FIGS. 9A and 9B include waveform charts which indicate the action of the special sound producing device of the sixth embodiment, in which FIG. 9A indicates the waveform of the first speaker, and FIG. 9B indicates the waveform of the second speaker.
Figure 9B:
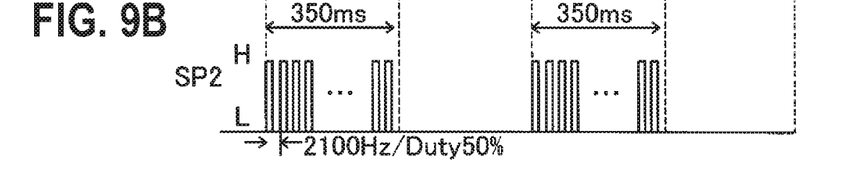

FIGS. 9A and 9B includes waveform charts which indicate the action of the special sound producing device 1 of the sixth embodiment, in which FIG. 9A indicates the waveform of the first speaker SP1, and FIG. 9B indicates the waveform of the second speaker SP2. As shown in FIGS. 9A and 9B, the signals output to the first speaker SP1 and the second speaker SP2 have a period of 700 ms. Among the signals of the 700 ms period, the former half portion becomes a frequency signal to repeat an H level and an L level alternately, and the latter half portion becomes a signal of the L level. The duty ratio of the frequency signal becomes 50%.

As shown in FIG. 9A, the frequency f1 of the frequency signal output to the first speaker SP1 becomes 1900 Hz. On the other hand, as shown in FIG. 9B, the frequency f2 of the frequency signal output to the second speaker SP2 becomes 2100 Hz. Thus, the frequencies f1, f2 of the two sides have a relation of $f1:f2=19:21$, not a relation of $n2:n2+1$. Thus, the sounds from the first and the second speakers SP1, SP2 have a relation of dissonance, and an uncomfortable sound can be output.

When the frequency f1 of the frequency signal output to the first speaker SP1 is 1900 Hz, the frequency f2 of the frequency signal output to the second speaker SP2 is not limited to 2100 Hz, but may be any other values if the relation of $f1:f2=n2:n2+1$ is not met.

When the uncomfortable sound is perceived by the vehicle crew, the sound pressure control ratios of the signals to the two speakers SP1, SP2 may be different. If the output timings (sound output periods) of the signals to the two speakers SP1, SP2 include overlapped periods, the overlapped periods may be different so that it is possible to have a sense of discomfort.

In this way, according to the special sound producing device 1 of the sixth embodiment, like the first embodiment, the variation of the sound to be provided in the vehicle is increased, the vehicle crew can easily grasp the meaning of the sound, and the warning sound whose meaning is easy to be grasped can be output from the front of the vehicle driver who most wants the warning sound to be transmitted quickly and precisely. The frequency signals can be superposed by the summing circuits 21, 22, and the variation of the sound can be further increased.

According to the sixth embodiment, when the frequency of the frequency signal to the first speaker SP1 is f1, the frequency f2 of the frequency signal to the second speaker SP2 is a value except the values calculated by the equation f1:f2=n2:n2+1 (n2 is an integer of 1 or more). Thereby, the sound output from the first speaker SP1 and the sound output from the second speaker SP2 have a relationship of dissonance, uncomfortable sounds can be output from the two speakers SP, and the variation of the sound to be provided in the vehicle can be increased.

The traditional device only produces the warning sound simply. Therefore, there is a problem that information is transmitted after the sound has a sense of warning degree (that is, the sense of the urgent degree of the warning). However, in the sixth embodiment, it is possible, for example, to transmit information by the sound from the first speaker SP1, and to have a sense of discomfort and to produce a degree of urgency by the sound from the second speaker SP2.

Although the present invention has been described above based on the embodiments, the present invention is not limited to the above embodiments, but modifications may be made without departing from the scope and spirit of the present invention, and the embodiments may be combined to the extent possible.

For example, in the above embodiments, it is described as examples that the warning sound is output from the plurality of speakers SP. But the present invention is not limited to a warning sound, other special sounds including a vehicle operation sound such as a turning sound to the vehicle crew, a sound to provide refreshment and comfort to the vehicle crew in the vehicle and a sound that instructs or supports the action of the vehicle crew may be output.

Furthermore, there are two speakers SP in the embodiment, but there may be three or more. In addition, the summing circuits 21, 22 sum the signals from the two terminals SG, but the summing circuits 21, 22 may sum signals from three or more terminals SG.

In the above embodiments, the two speakers SP1, SP2 are provided at the back side of the meter unit M, but the two speakers SP1, SP2 may be provided at the front side of the meter unit M. Further, the two speakers may be placed within an enclosure (housing for speakers) which is attached to an outer case of the meter unit M.

The features of the special sound producing device according to the embodiments of the present invention described above are briefly, collectively listed in the following [1] to [8], respectively.

[1] A special sound producing device (1) which is loaded in a vehicle, and provides information to a vehicle crew by a special sound, comprising a plurality of speakers (SP1, SP2) which become the power sources of the special sound, and a control means (control unit 10) which generates frequency signals to make the special sound output from the plurality of speakers respectively, wherein when one information to be transmitted to the vehicle crew is transmitted by the special sound from the plurality of speakers, the control means makes the frequencies of the frequency signals, the sound pressures of the special sound or the output timings to the speakers of the frequency signals to be different between the plurality of speakers.

[2] The special sound producing device of the above [1], wherein the plurality of speakers are placed at a meter unit (M) in which vehicle instruments are loaded, and information to promote attention by a warning sound is provided to the vehicle crew.

[3] The special sound producing device according to the above [2], wherein the plurality of speakers are two speakers, and when the sound pressures of the special sound are made different, the control means equalizes the output timings of the frequency signals and the frequencies of the frequency signals to the two speakers, gradually decreases a sound pressure control ratio which indicates either of a duty ratio of the frequency signal or an on duty, which is the duty ratio during on state, of the frequency signal to one speaker from a first predetermined value to a second predetermined value which is smaller than the first predetermined value, and gradually increases the sound pressure control ratio of the frequency signal to the other speaker (SP2) from the second predetermined value to the first predetermined value.

[4] The special sound producing device according to the above [2], wherein the plurality of speakers are two speakers, and when the output timings are made different, the control means equalizes the sound pressures of the special sound and the frequencies of the frequency signals, makes the output timing of the frequency signal to one speaker (SP1) and the output timing of the frequency signal to the other speaker (SP2) overlapped, and makes the output timing of the frequency signal to the other speaker delayed for more than a predetermined time than the output timing of the frequency signal to the one speaker.

[5] The special sound producing device according to the above [2], wherein the plurality of speakers are two speakers, and when the frequencies of the frequency signals are made different, if the frequency of the frequency signal to the one speaker (SP1) is f1, the control means sets the frequency f2 of the frequency signal to the second speaker (SP2) as a value calculated by an equation f1:f2=n:n+1 (n is an integer of 1 or more).

[6] The special sound producing device according to the above [2], wherein the plurality of speakers are two speakers, and when the frequencies of the frequency signals are made different, if the frequency of the frequency signal to the one speaker (SP1) is f1, the control means sets the frequency f2 of the frequency signal to the second speaker (SP2) as a value except values calculated by an equation f1:f2=n:n+1 (n is an integer of 1 or more).

[7] The special sound producing device according to the above [2], wherein the plurality of speakers are two speakers, and when the output timings are made different, the control means equalizes the frequencies of the frequency signals to the two speakers, makes the output timing of the frequency signal to one speaker (SP1) and the output timing of the frequency signal to the other speaker (SP2) overlapped, and makes the output timing of the frequency signal to the other speaker delayed for less than a predetermined time from the output timing of the frequency signal to the one speaker.

[8] The special sound producing device according to the above [2], wherein the plurality of speakers are two speakers, and when the output timings are made different, the control means repeats an action of outputting the frequency signal to the other speaker after having output the frequency signal to one speaker, prohibits the output of the frequency signal to the other speaker in the output timing of the frequency signal to the one speaker and prohibits the output of the frequency signal to the one speaker in the output timing of the frequency signal to the other speaker.

Although the invention is described in detail with reference to the specific embodiments, it is apparent that various modifications and amendments may be made by those skilled in the art without departing from the spirit and scope of the invention.

This application is based on the Japanese patent application (Japanese patent application No. 2014-119499) filed on Jun. 10, 2014 and the Japanese patent application (Japanese patent application No. 2014-258269) filed on Dec. 22, 2014, whose contents are incorporated herein by reference.

INDUSTRIAL APPLICABILITY

According to the present invention, effects are played that frequency signals can be superposed by the summing circuits, and the variation of sound can be further increased. The present invention playing the effects is useful in a special sound producing device that provides information to a vehicle crew by a special sound.

REFERENCE SIGNS LIST 1 special sound producing device
10 control unit
20 summing circuit
30 amplifier
M meter unit
SG1-SG4 sound generator terminal
SP a plurality of speakers
SP1 first speaker (one speaker)
SP2 second speaker (the other speaker)

What is claimed is:

1. A special sound producing device which is loaded in a vehicle, and provides information to a vehicle crew by a special sound, comprising:

a plurality of speakers that become power sources of the special sound; and a control unit that generates frequency signals to make the special sound output from the plurality of speakers respectively, wherein when one information to be transmitted to the vehicle crew is transmitted by the special sound from the plurality of speakers, the control unit makes frequencies of the frequency signals, sound pressures of the special sound or output timings to the speakers of the frequency signals to be different between the plurality of speakers, wherein the plurality of speakers are two speakers, and when the sound pressures of the special sound are made to be different, the control unit equalizes the output timings of the frequency signals and the frequencies of the frequency signals to the two speakers, gradually decreases a sound pressure control ratio which indicates either of a duty ratio of a frequency signal or an on duty, which is the duty ratio during an on state, of the frequency signal to one speaker from a first predetermined value to a second predetermined value which is smaller than the first predetermined value, and gradually increases the sound pressure control ratio of a frequency signal to the other speaker from the second predetermined value to the first predetermined value.

2. The special sound producing device according to claim 1, wherein the plurality of speakers are placed at a meter unit in which vehicle instruments are loaded, and information to promote attention by a warning sound is provided to the vehicle crew.

3. A special sound producing device, which is loaded in a vehicle, and provides information to a vehicle crew by a special sound, comprising:

a plurality of speakers that become power sources of the special sound; and a control unit that generates frequency signals to make the special sound output from the plurality of speakers respectively, wherein when one information to be transmitted to the vehicle crew is transmitted by the special sound from the plurality of speakers, the control unit makes frequencies of the frequency signals, sound pressures of the special sound or output timings to the speakers of the frequency signals to be different between the plurality of speakers, wherein the plurality of speakers are two speakers, and when the output timings are made to be different, the control unit equalizes the sound pressures of the special sound and the frequencies of the frequency signals, makes an output timing of the frequency signal to one speaker and an output timing of a frequency signal to the other speaker overlapping, and makes the output timing of a frequency signal to the other speaker delayed for more than a predetermined time than the output timing of the frequency signal to the one speaker.

4. A special sound producing device which is loaded in a vehicle, and provides information to a vehicle crew by a special sound, comprising:

a plurality of speakers that become power sources of the special sound; and a control unit that generates frequency signals to make the special sound output from the plurality of speakers respectively, wherein when one information to be transmitted to the vehicle crew is transmitted by the special sound from the plurality of speakers, the control unit makes frequencies of the frequency signals, sound pressures of the special sound or output timings to the speakers of the frequency signals to be different between the plurality of speakers, wherein the plurality of speakers are two speakers, and when the frequencies of the frequency signals are made to be different, if a frequency of a frequency signal to one speaker is f1, the control unit sets a frequency f2 of a frequency signal to the other speaker as a value calculated by an equation $f1:f2=n:n+1$, in which n is an integer of 1 or more.

5. A special sound producing device which is loaded in a vehicle, and provides information to a vehicle crew by a special sound, comprising:

a plurality of speakers that become power sources of the special sound; and a control unit that generates frequency signals to make the special sound output from the plurality of speakers respectively, wherein when one information to be transmitted to the vehicle crew is transmitted by the special sound from the plurality of speakers, the control unit makes frequencies of the frequency signals, sound pressures of the special sound or output timings to the speakers of the frequency signals to be different between the plurality of speakers, wherein the plurality of speakers are two speakers, and when the frequencies of the frequency signals are made to be different, if a frequency of a frequency signal to one speaker is f1, the control unit sets a frequency f2 of a frequency signal to the other speaker as a value except values calculated by an equation f1:f2=n:n+1, in which n is an integer of 1 or more.

6. A special sound producing device which is loaded in a vehicle, and provides information to a vehicle crew by a special sound, comprising:

a plurality of speakers that become power sources of the special sound; and a control unit that generates frequency signals to make the special sound output from the plurality of speakers respectively, wherein when one information to be transmitted to the vehicle crew is transmitted by the special sound from the plurality of speakers, the control unit makes frequencies of the frequency signals, sound pressures of the special sound or output timings to the speakers of the frequency signals to be different between the plurality of speakers, wherein the plurality of speakers are two speakers, and when the output timings are made to be different, the control unit equalizes the frequencies of the frequency signals to the two speakers, makes an output timing of a frequency signal to one speaker and an output timing of a frequency signal to the other speaker overlapping, and makes the output timing of the frequency signal to the other speaker delayed for less than a predetermined time from the output timing of the frequency signal to the one speaker.

7. A special sound producing device which is loaded in a vehicle, and provides information to a vehicle crew by a special sound, comprising:

a plurality of speakers that become power sources of the special sound; and a control unit that generates frequency signals to make the special sound output from the plurality of speakers respectively, wherein when one information to be transmitted to the vehicle crew is transmitted by the special sound from the plurality of speakers, the control unit makes frequencies of the frequency signals, sound pressures of the special sound or output timings to the speakers of the frequency signals to be different between the plurality of speakers, wherein the plurality of speakers are two speakers, and when the output timings are made to be different, the control unit repeats an action of outputting a frequency signal to one speaker after having output a frequency signal to the other speaker, prohibits the output of the frequency signal to the one speaker in the output timing of the frequency signal to the other speaker and prohibits the output of the frequency signal to the other speaker in the output timing of the frequency signal to the one speaker.

8. The special sound producing device according to claim 3, wherein the plurality of speakers are placed at a meter unit in which vehicle instruments are loaded, and information to promote attention by a warning sound is provided to the vehicle crew.

9. The special sound producing device according to claim 4, wherein the plurality of speakers are placed at a meter unit in which vehicle instruments are loaded, and information to promote attention by a warning sound is provided to the vehicle crew.

10. The special sound producing device according to claim 5, wherein the plurality of speakers are placed at a meter unit in which vehicle instruments are loaded, and information to promote attention by a warning sound is provided to the vehicle crew.

11. The special sound producing device according to claim 6, wherein the plurality of speakers are placed at a meter unit in which vehicle instruments are loaded, and information to promote attention by a warning sound is provided to the vehicle crew.

12. The special sound producing device according to claim 7, wherein the plurality of speakers are placed at a meter unit in which vehicle instruments are loaded, and information to promote attention by a warning sound is provided to the vehicle crew.

* * * * *